United States Patent
Centonze et al.

(10) Patent No.: US 8,332,939 B2
(45) Date of Patent: *Dec. 11, 2012

(54) SYSTEM AND METHOD FOR THE AUTOMATIC IDENTIFICATION OF SUBJECT-EXECUTED CODE AND SUBJECT-GRANTED ACCESS RIGHTS

(75) Inventors: Paolina Centonze, Amawalk, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 1695 days.

This patent is subject to a terminal disclaimer.

(21) Appl. No.: 11/677,272

(22) Filed: Feb. 21, 2007

(65) Prior Publication Data

US 2008/0201693 A1    Aug. 21, 2008

(51) Int. Cl.
*H04L 29/06* (2006.01)
(52) U.S. Cl. .............................................. 726/22; 726/1
(58) Field of Classification Search ................ 726/1, 22, 726/25; 717/126, 131, 132, 133
See application file for complete search history.

(56) References Cited

U.S. PATENT DOCUMENTS

| | | | |
|---|---|---|---|
| 7,962,901 | B2 | 6/2011 | McCamant et al. |
| 8,006,233 | B2 | 8/2011 | Centonze et al. |
| 2002/0184486 | A1 | 12/2002 | Kershenbaum et al. |
| 2003/0212924 | A1 | 11/2003 | Avvari et al. |
| 2004/0040017 | A1 | 2/2004 | Kershenbaum et al. |
| 2005/0010804 | A1 | 1/2005 | Bruening et al. |
| 2005/0015752 | A1 | 1/2005 | Alpern et al. |
| 2005/0055565 | A1* | 3/2005 | Fournet et al. ................ 713/200 |
| 2005/0065973 | A1 | 3/2005 | Steensgaard et al. |
| 2005/0071813 | A1 | 3/2005 | Reimer et al. |
| 2005/0097533 | A1 | 5/2005 | Chakrabarti et al. |
| 2005/0188364 | A1 | 8/2005 | Cockx et al. |
| 2005/0262487 | A1 | 11/2005 | Pistoia et al. |
| 2007/0016894 | A1 | 1/2007 | Sreedhar |

(Continued)

FOREIGN PATENT DOCUMENTS

FR    2868566 A1    10/2005

OTHER PUBLICATIONS

Ole Agesen "The Cartesian Product Algorithm: Simple and Precise Type Inference of Parametric Polymorphism", In Proceedings of the 9th ECOOP, pp. 2-26, Aarhus, Denmark, Aug. 1995, Spring-Verlag.

(Continued)

*Primary Examiner* — Edward Zee
(74) *Attorney, Agent, or Firm* — Cantor Colburn LLP; Preston Young

(57) ABSTRACT

The present invention relates to a method for identifying subject-executed code and subject-granted access rights within a program, the method further comprising the steps of: constructing a static model of a program, and determining a set of access rights that are associated with each subject object that is comprised within the program. The method further comprises the steps of annotating the invocation graph with the set of access right data to generate a subject-rights analysis, wherein each node comprised within the invocation graph is mapped to a set of access rights that represent subject-granted access rights under which a method that corresponds to a respective node will be executed, and utilizing the subject-rights analysis to perform a subject-rights analysis of the program.

15 Claims, 11 Drawing Sheets

U.S. PATENT DOCUMENTS

2007/0180441 A1 8/2007 Ding et al.
2007/0261124 A1 11/2007 Centonze et al.
2008/0201688 A1 8/2008 Centonze et al.
2008/0201693 A1 8/2008 Centonze et al.
2008/0201760 A1 8/2008 Centonze et al.
2008/0229278 A1 9/2008 Liu et al.
2008/0306958 A1 12/2008 Sreedhar

OTHER PUBLICATIONS

Paul Anderson et al., "Design and Implementation of a Fine-Grained Software Inspection Tool", IEEE Transactions on Software Engineering, 29 (8): pp. 721-733, Aug. 2003.

Paul et al., "Net Security: Lesson Learned and Missed from Java", University of Virginia Department of Computer Science, in Proceedings of the ACSAC, pp. 1-10, Dec. 2003.

Gary A. Kildall, "A Unified Approach to Global Program Optimization", Proceedings of the 1st Annual ACM SIGACT-SIGPLAN Symposium on Principles of Programming Languages, pp. 194-206, BOston, MA, USA, 1973, ACM Press.

Pistola et al., "Interprocedural Analysis for Privileged Code Placement and Tainted Variable Detection", in Proceedings of the 19th European Conference on Object-Oriented Programming, pp. 362-386, Glasgow, Scotland UK, Jul. 2005, Springer-Verlag.

Barbara G. Ryder, "Dimensions of Precision in Reference Analysis of Object-Oriented Languages", in Proceedings of the 12th International Conference on Compiler Construction, pp. 126-137, Warsaw, Poland, Apr. 2003, Invited Paper.

Koved et al., "Access Rights Analysis for Java", in Proceedings of the 17th ACM SIGPLAN Conference on Object-Oriented Programming, Systems, Languages, 2002.

Lai et al., "User Authentication and Authorization in the JavaTM Platform", in Proceedings of the 15th Annual Computer Security Applications Conference, pp. 285-290, Scottsdale, AZ, USA, Dec. 1999, IEEE Computer Security.

Saltzer et al., "The Protection of Information in Computer Systems", in Proceedings of the IEEE, vol. 63, pp. 1278-1308, Sep. 1975.

Gulwani et al., "Path-Sensitive Analysis for Linear Arithmetic and Uninterpreted Functions", in 11th Static Analysis Sumposium, vol. 3148 of LNCS, pp. 328-343, Aug. 2004.

Gleb Naumovich, "A Conservative Algorithm for Computing the Flow of Permissions in Java Programs", in Proceedings with ISSTA, pp. 33-43, Rome, Italy, Jul. 2002.

Gleb Naumovich, "A Conservative Algorithm for Computing the Flow of Permissions in Java Programs", Dec. 2001, http://cis.poly.edu/tr/tr-cls-2001-07.pdf.

N. Paul et al., ".NET Security: Lessons Learned and Missed from Java," Univ. VA, Dept. Computer Science, Proceedings of the ACSAC, pp. 1-10, 20th Annual Computer Security Applications Conference (ACSAC), Dec. 6-10, 2004, Tucson, Arizona.

P. Centonze et al., "Role-Based Access Control Consistency Validation," Proceedings of 2006 International Symposium on Software Testing and Analysis (ISSTA 2006), pp. 121-132, Jul. 17-20, 2006, Portland, Maine, USA, Copyright 2006 ACM Press.

* cited by examiner

```
import java.io.*;
import java.net.*;
public class LibraryCode {
    private static String logFileName = "audit.txt";
    public static Socket createSocket(String host, int port)
            throws UnknownHostException, IOException {
        // Create the Socket
        Socket socket = new Socket(host, port);
        // Log the Socket operation to a file
        FileOutputStream fos = new FileOutputStream(logFileName);
        BufferedOutputStream bos = new BufferedOutputStream(fos);
        PrintStream ps = new PrintStream(bos, true);
        ps.print("Socket " + host + ":" + port);
        return socket;
    }
}
```

FIG. 3

```
import java.io.*;
import java.net.*;
import java.security.*;
public class LibraryCode2{
    private static final String logFileName = "audit.txt";
    public static Socket createSocket(String host, int port) throws
            UnknownHostException, IOException, PrivilegedActionException {
        // Create the Socket
        Socket socket = new Socket(host, port);
        // Log the Socket operation to a file using dopriviledged
        File f = new File(logFileName);
        PrivWriteOp op = new PrivWriteOp(host, port, f);
        FileOutputStream fos = (FileOutputStream)
            AccessController.doprivileged(op);
        BufferedOutputStream bos = new BufferedOutputStream(fos);
        PrintStream ps = new PrintStream(bos,true);
        ps.print("Socket " + host + ":" + port);
        return socket;
    }
}
class PrivWriteOp implements PrivilegedExceptionAction {
    private File f;
    PrivWriteOp (File f) {
        this.f = f;
    }
    public Object run() throws IOException{
        return new FileOutputStream(f);
    }
}
```

FIG. 5

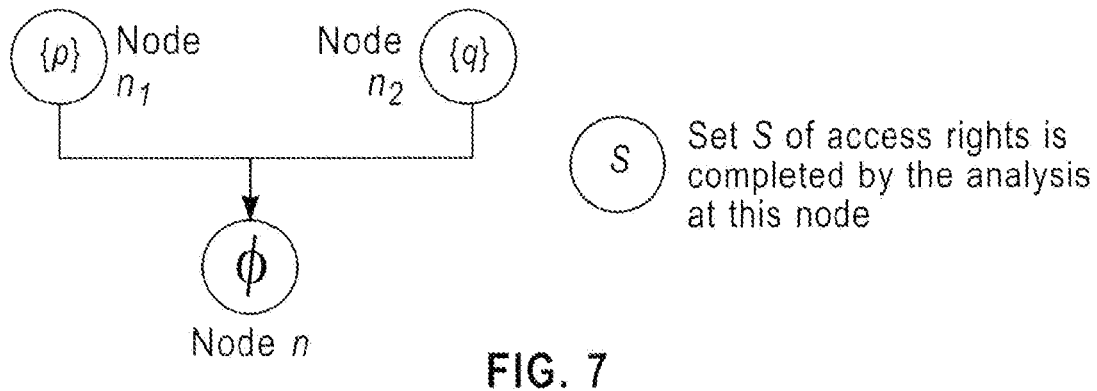
FIG. 7
```
class X {
    A  a = new A( );
    void foo( ) {
        a.setB(new Object( ) );
    }
} class A {
    B  b = new Object( );
    void setB(Object b) {
        this.b = b;
    }
}
```
FIG. 8
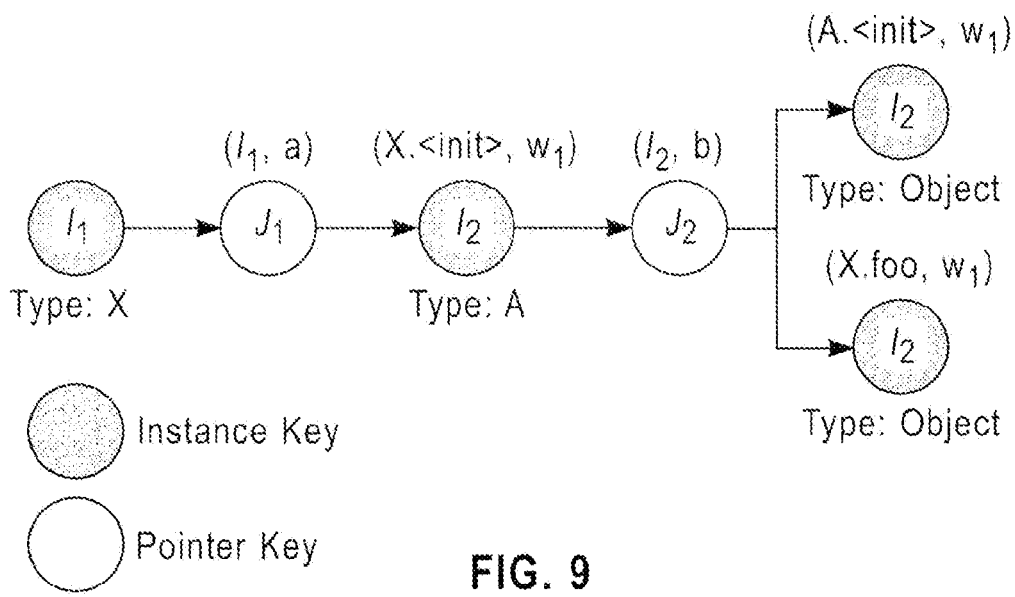
FIG. 9

```
class Z {
    Y y1 = new Y( );
    Y y2 = new Y( );
} class Y {
    F f;
}
```

```
grant
    Principal javax.security.auth.x500.X500Principal
        "CN=Marco Pistoia, OU=Research, O=IBM, C=US" {
        permission java.util.PropertyPermission "user.home" , "read";
        permission java.io.FilePermission "log.txt", "read";
        permission java.security.SecurityPermission "getPolicy";
};
```

FIG. 12

```
grant
    Principal javax.security.auth.x500.X500Principal
        "CN=Marco Pistoia, OU=Research, O=IBM, C=US"
    Principal javax.security.auth.kerberos.KerberosPrincipal
        "pistoia@us.ibm.com" {
        permission java.util.PropertyPermission "user.home" , "read";
        permission java.io.FilePermission "log.txt", "read";
        permission java.security.SecurityPermission "getPolicy";
};
```

FIG. 13

```
grant
    Principal c₁ "t₁"
    Principal c₂ "t₂"
       ⋮
    Principal cₕ "tₕ" {
        permission p₁;
        permission p₂;
            ⋮
        permission pₖ;
    };
```

FIG. 14

1:  for $l := 1$ to h do
2:     if $\psi_{s,g}(c_l) = \phi$ then
3:        return $\phi$
4:  for $l := 1$ to h do
5:     boolean *found* := false
6:     for each $x \in \psi_{s,g}(c_l)$ do
7:        if $t_l \in v_T(u_{r,x})$ then
8:           *found* := true
9:           break
10:    if *found* = false
11:       return $\phi$
12: return $\{p_1\} \sqcup \{p_2\} \sqcup \ldots \sqcup \{p_k\}$

FIG. 15

SYSTEM AND METHOD FOR THE AUTOMATIC IDENTIFICATION OF SUBJECT-EXECUTED CODE AND SUBJECT-GRANTED ACCESS RIGHTS

BACKGROUND OF THE INVENTION

1. Field of the Invention

This invention relates to the granting of access rights to users or services within a computing system environment, and particularly to the identification of subjected-executed and subject-granted access rights within programming code.

2. Description of Background

Before our invention programming and code execution environments, such as Java™ and Microsoft™ .NET Common Language Runtime (CLR), allowed for the granting of permissions to users or services, known as subjects. Typically, a subject is granted the permissions granted to its authenticated principals. Further, specialized functions can be called to execute specific actions under the authority of a respective subject. However, this approach has the potential to lead to security problems because it is difficult, if not impossible, to manually pre-determine the portions of code that will be executed under the authority of a subject, and further, the access rights the code is going to be granted by virtue of being executed by a subject.

As a result of, security policies have often been poorly defined. As such, the poor definition of security policies could lead to violations of the Principle of Least Privilege (PLP) if too many permissions have been granted, or further, to program execution stability problems if too few permissions have been granted. Traditionally, these problems have been resolved with testing and manual code inspection. However, testing is limited because if a particular test case does not cover a particular path of execution, security requirements may remain undiscovered until run time, rendering the application unstable. Manual code inspection is impractical, tedious, time consuming, and error prone. Furthermore, the source code of an application may even be unavailable, because it might have been machine generated, or purchased from a third party.

Therefore, there exist a need for methodologies to automatically determine the methods in a program that will be executed under the authority of a subject (i.e., a user or service) at the time of program execution, wherein the rights have been granted to subjects based on the current security policy are identified.

SUMMARY OF THE INVENTION

The shortcomings of the prior art are overcome and additional advantages are provided through the provision of a method for identifying subject-executed code and subject-granted access rights within a program, the method further comprising the steps of: constructing a static model of a program, wherein the static model comprises: an invocation graph, the invocation graph comprising a set of nodes and a set of edges, the invocation graph being configured to visually represent programming methods as nodes, and the calling context that is associated with a respective programming method; and a points-to graph, the points-to graph being configured to model the dependencies that exist between program objects, and determining a set of access rights that are associated with each subject object that is comprised within the program. The method further comprises the steps of annotating the invocation graph with the set of access right data to generate a subject-rights analysis, wherein each node comprised within the invocation graph is mapped to a set of access rights that represent subject-granted access rights under which a method that corresponds to a respective node will be executed, and utilizing the subject-rights analysis to perform a subject-rights analysis of the program.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of library code for the propagation of authorization requirements to clients.

FIG. 5 illustrates one example of library using privilege code.

FIG. 7 illustrates one example the conservativeness that is introduced by a standard power-set lattice meet operation.

FIG. 8 illustrates one example of application code illustrating aspects of a SPRTG.

FIG. 9 illustrates one example a SPRTG that corresponds to the code of FIG. 8.

FIG. 12 illustrates one example of code illustrating the granting of access rights to a principal.

FIG. 13 illustrates one example of code illustrating the granting of access rights to a combination of two principals.

FIG. 14 illustrates one example a generic principal-based statement g∈D.

FIG. 15 illustrates one example of an algorithm to compute $\Sigma/_{S \times D}(s_r, g)$.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the present invention relate to the performance of static code analysis procedures, wherein the static code analysis is performed in accordance with formal analysis methodologies. Aspects of the present invention may be implemented within conventional computing systems, wherein the static analysis methodologies, as discussed herein, can be performed in accordance with conventional automated analysis tool methodologies.

The Java™ 2 and CLR programming models are extensively used in multiple types of Internet applications, especially applications relating to electronic commerce. Due to the distributed nature of such applications it is essential that when access to a restricted resource is attempted ail code currently on a call stack is authorized to access the restricted resource. In Java™ 2, when access to a restricted resource is attempted the SecurityManager, if active, triggers access-control enforcement protocols by invoking AccessController.checkPermission method command.

Figure 1:
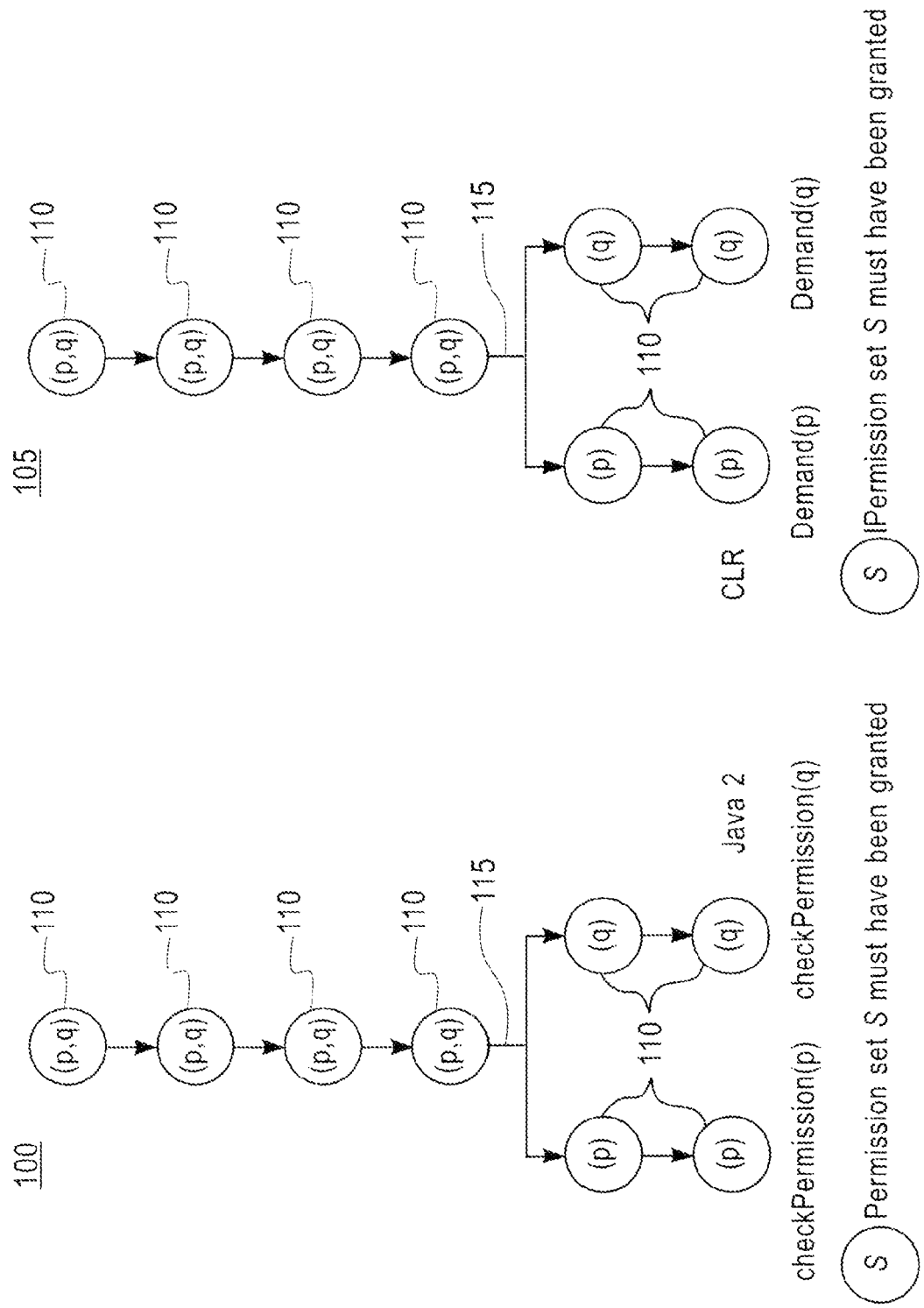
FIG. 1 illustrates one example representing the executions of two program threads within a Java™ 2 and CLR SBAC system.

This method utilizes a Permission object p as a parameter, and performs a stack walk to verify that each caller in a current thread of execution has been granted the access right that is represented by p. In CLR, the stack walk is performed by the Demand method, which verifies that all the code currently on the stack has been granted the access right represented by a given IPermission object. FIG. 1 illustrates a comparison between the Java™ 2 100 and CLR 105 stack based access control (SBAC) systems. The two directed graphs (100, 105) in FIG. 1 represent the executions of two program threads on a Java™ 2 and CLR platform, respectively, where the vertices 110 in the graphs are representative of method invocations. If two vertices 110 are connected by an edge 115, that means that the method represented by the predecessor vertex 110 in the edge invokes the method represented by the successor vertex 110. In both platforms (100, 105), when SBAC is enforced, a SecurityException is thrown if any one of the callers on the call stack does not have the appropriate access right.

Access Rights

Though programmatic security is possible, within both the Java™ 2 and CLR platforms, access rights are preferably declaratively granted. Within both platforms a system administrator grants access rights in a security policy database that is external to the application code; this aspect enhances code portability and reusability. Typically, in SBAC systems, access rights are by default denied to all code and subjects. Untrustworthy code and subjects will only be allowed to perform basic operations that cannot harm the system. For a restricted operation to succeed, all the code on the thread's stack must be explicitly granted the right, to execute that operation.

Within Java™ 2, access rights are represented as objects of type Permission. Each Permission type must be a subclass of the Permission abstract class. When a Permission object is constructed, it can take zero (0), one (1), or two (2) string objects as parameters. If present, a first parameter is called the target of the Permission object and represents the resource that is being protected, whereas the second parameter is called the action of the Permission object and represents the mode of access. The target and action are used to qualify the resource being protected by the Permission object. For example, the following line of code can be used to construct a Permission object representing the right to access the log.txt file in read and write mode:

Permission p=new FilePermission ("log.txt", "read, write");

Given a Permission object p, p's fully qualified Permission class name along with p's target and action, if any, uniquely identify the authorization requirement represented by p. Therefore, for authorization purposes, a Permission object p can be characterized solely based on p's permission ID, which consists of p's fully qualified class name and the values of the string instances used to instantiate p. Moreover, in the Java™ 2 Runtime Environment (J2RE) reference implementation, authorizations are granted to programs and principals by just listing the corresponding permission IDS in a flat-file policy database, called the policy file.

The Permission class contains an abstract method named implies, which itself takes a Permission object as a parameter and returns a Boolean value that every non-abstract Permission subclass must implement. If p and q are two Permission objects and p.implies (q) returns true, then this means that, granting p is implicitly equivalent to having granted q as well. For example, p could be the Permission object constructed above and q could be the Permission object constructed with the following line of code:

Permission q=new FilePermission ("log.txt", "writes");

If p is an instance of the AllPermission class, then p.implies (q) returns true for any Permission object q.

Access rights may be granted to code based on the code source, which is a combination of the code base (i.e., the network location from which the code is coming) and the digital certificates of the entities that digitally signed the code. In Java™ 2, access rights are granted to classes, wherein each class is loaded at run time by a class loader. Class loaders are organized as a tree, the tree being referred to as the classloading delegation tree. A class loader, when it loads a class, constructs a protection domain characterizing the origin of the class being loaded, and associates it with the class itself. A protection domain, which is represented as an object of type ProtectionDomain, encapsulates the class' code source (which is represented as a Codesource object) and a PermissionCollection object that contains all of the Permissions corresponding to the access rights that have been granted to the code source. When invoked with a Permission p as a parameter, checkPermission performs a stack walk and verifies that each of the ProtectionDomains in the current thread of execution contains at least one Permission that implies p. The set of Permissions effectively granted to a thread of execution is the intersection of the sets of Permissions implied by all of the ProtectionDomains associated with the stack. Access-control enforcement employed on a CLR platform is implemented in a similar manner.

From a security point-of-view, it should be noted that violations of the Principle of Least Privilege could arise in the instance that unnecessary rights are granted to code. Conversely, if the rights granted to code are insufficient to meet the code's security requirements, run-time authorization failures may then occur; such an occurrence can cause an application to crash.

Privilege-Asserting Code

Often, trusted library code is programmed to perform access-restricted operations—such operations as writing to a log file or reading from a configuration file that an untrustworthy client did not explicitly request. Since the untrustworthy client will be on the call stack when access control is enforced, the operation will not succeed unless the client code is authorized as well. To avoid authorizing the client (this action constituting a violation of the Principle of Least Privilege) the portion of library code performing the restricted operation can be made privileged.

In Java™ 2, a block of library code is made privilege-asserting by wrapping the code within a call to AccessController.doPrivileged. This method takes either a PrivilegedAction or a PrivilegedExceptionAction parameter, whose run method contains the portion of code that needs to be made privileged. When access control is enforced, the presence of privilege-asserting code on the call stack causes the stack walk to stop at the stack frame corresponding to the library method calling doPrivileged. As a result, the library code calling doPrivileged must have been granted the right to perform the restricted operation, but the client code is implicitly granted that right while the current thread is executing. A potential problem generated by doPrivileged is that, if a call to doPrivileged leads to multiple checkPermission calls with different, Permissions being checked, all those Permissions will be implicitly granted to client code indiscriminately.

Figure 2:
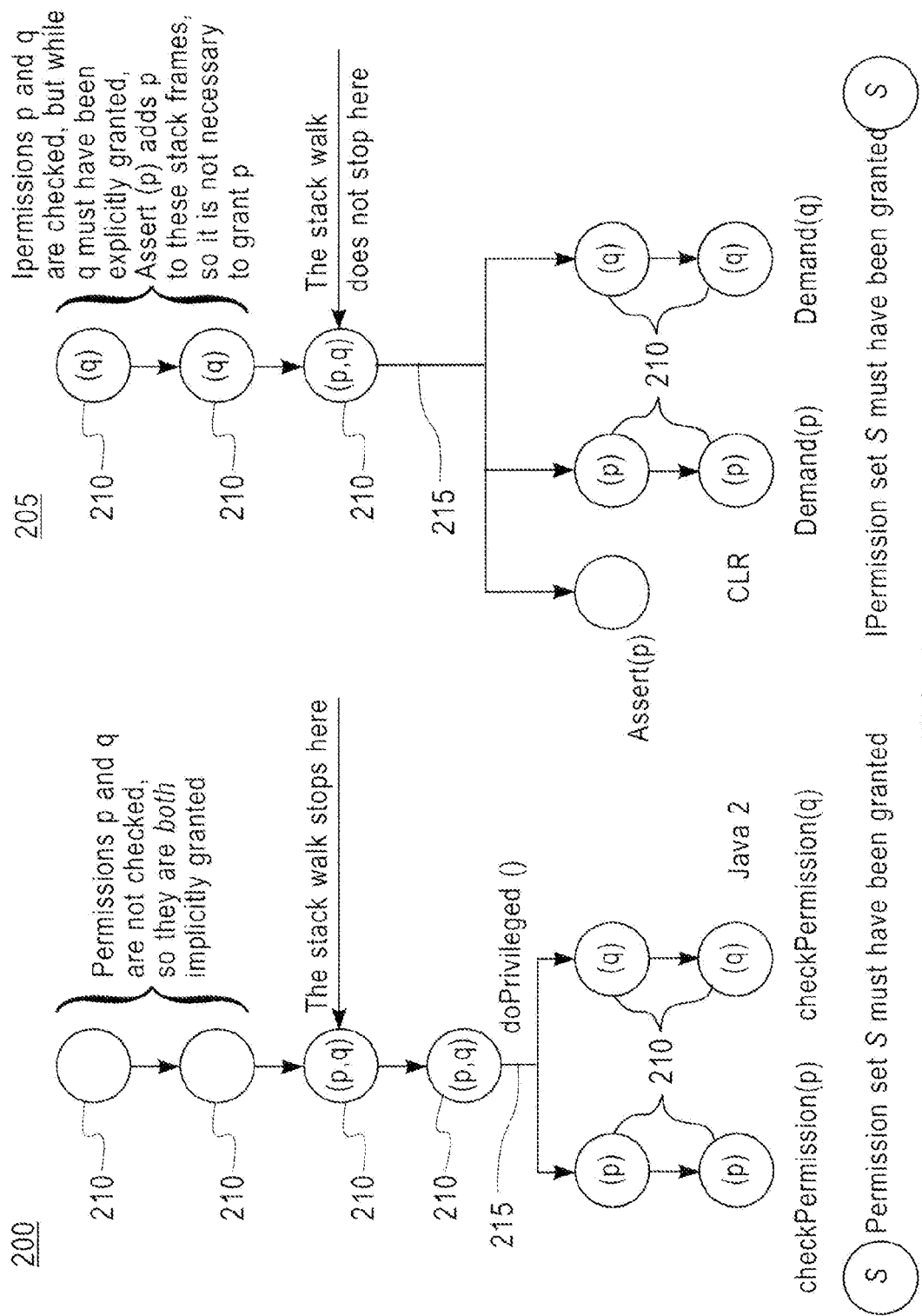
FIG. 2 illustrates one example of privilege code in the Java™ 2 and CLR SBAC system.

In CLR, the mechanism for privilege-asserting code is more granular. To make code privileged, a trusted library code must call the Assert method with an IPermission object p as a parameter. The difference from Java's™ doPrivileged is that Assert does not cause the stack walk to stop, but instead adds p to the stack frames above the library method that makes the call to Assert. Therefore, unlike doPrivileged, Assert allows specifying exactly which access right should be implicitly granted to client code, regardless of the IPermission being checked by the Demand method currently on the stack. FIG. 2 shows and compares how privilege-asserting code works in the Java™ 2 and CLR platforms, respectively.

The Java™ 2 platform offers another form of doPrivileged that takes an additional AccessControlContext instance as an argument. This instance encapsulates an array of ProtectionDomain objects that are typically associated with the thread stack at the moment In which the AccessControlContext was instantiated. When it encounters a call from this form of doPrivileged, checkPermission stops its stack walk at the stack frame corresponding to the method that made that doPrivileged call. In addition, checkPermission performs an authorization test on each of the ProtectionDomains encapsulated in the AccessControlContext.

Figure 4:
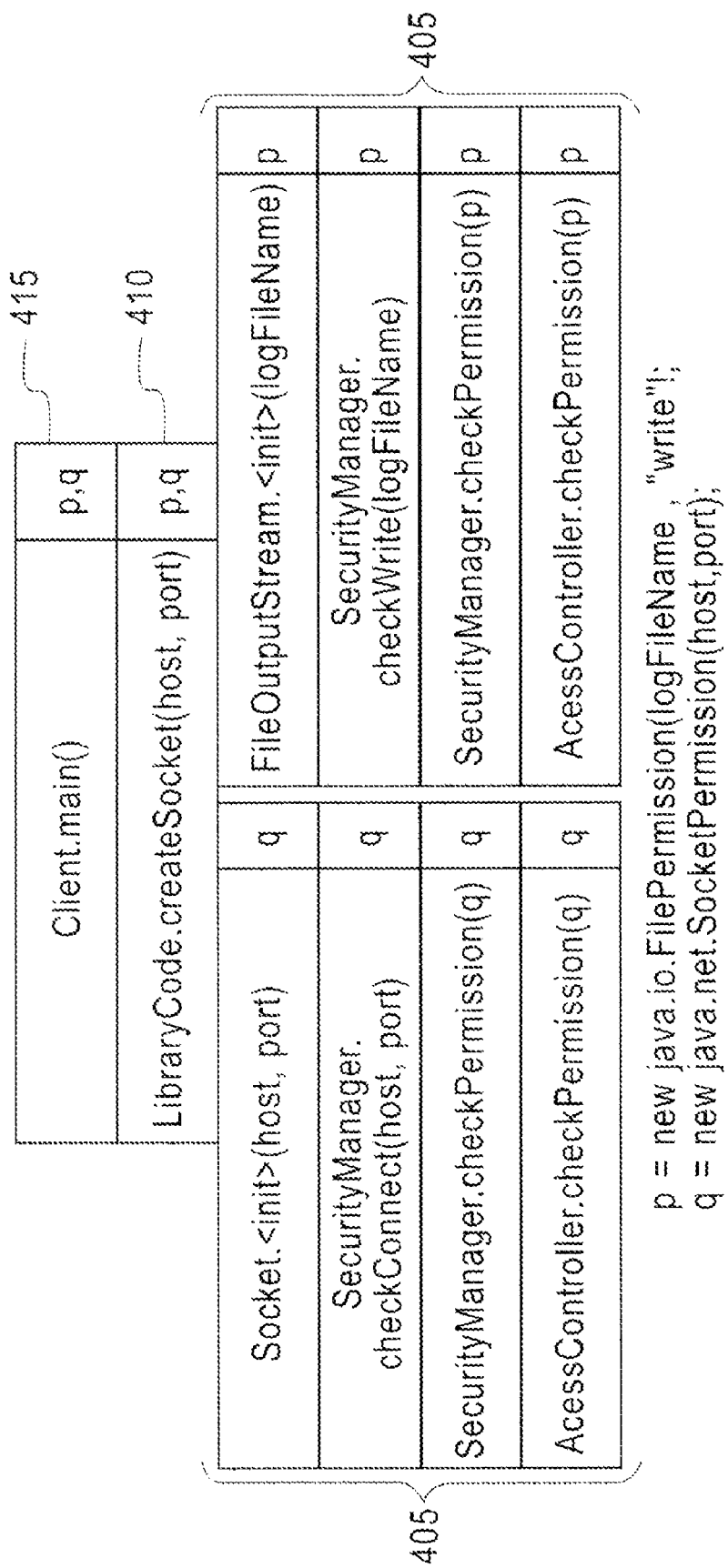
FIG. 4 illustrates one example of the propagation of unnecessary authorization requirements to client code.

When a client application makes a call to a trusted library, the library often accesses restricted resources that the client never intended to, or does not need to directly access. For instance, assume that a Java™ program is authorized to open a network socket. To do so, it invokes createsocket on the LibraryCode library class as illustrated in FIG. 3. On opening a socket on behalf of a client program, the library is programmed to log the socket operation to a file for auditing purposes. As shown in FIG. 4, according to the Java™ 2 SDAC model, both the library 410 and its client 415 will need to be granted the FilePermission to modify the log file and the SocketPermission to create the socket connection (as dictated by the preceding methods 405), even though the client did not explicitly request, to write to the log file. Granting that FilePermission to the client code would violate the Principle of Least Privilege.

One way to circumvent this particular problem is to mark the portion of the library code responsible for logging as privileged. On a Java™ 2 platform, this prevents the stack inspection for the log operation from going beyond the createsocket method, and temporarily exempts the client from the FilePermission requirement during the execution of createsocket. From a practical point of view, a Java™ developer must implement either the PrivilegedExceptionAction or PrivilegedAction interface depending on whether the privilege-asserting code could throw a checked Exception or not, respectively. Both of these interfaces have a run method that upon implementation must contain the portion of library code performing the restricted operation not directly requested by the client. Next, the PrivilegedExceptionAction or PrivilegedAction instance is passed as a parameter to the doPrivileged method, which will invoke the instance's run method.

Figure 6:
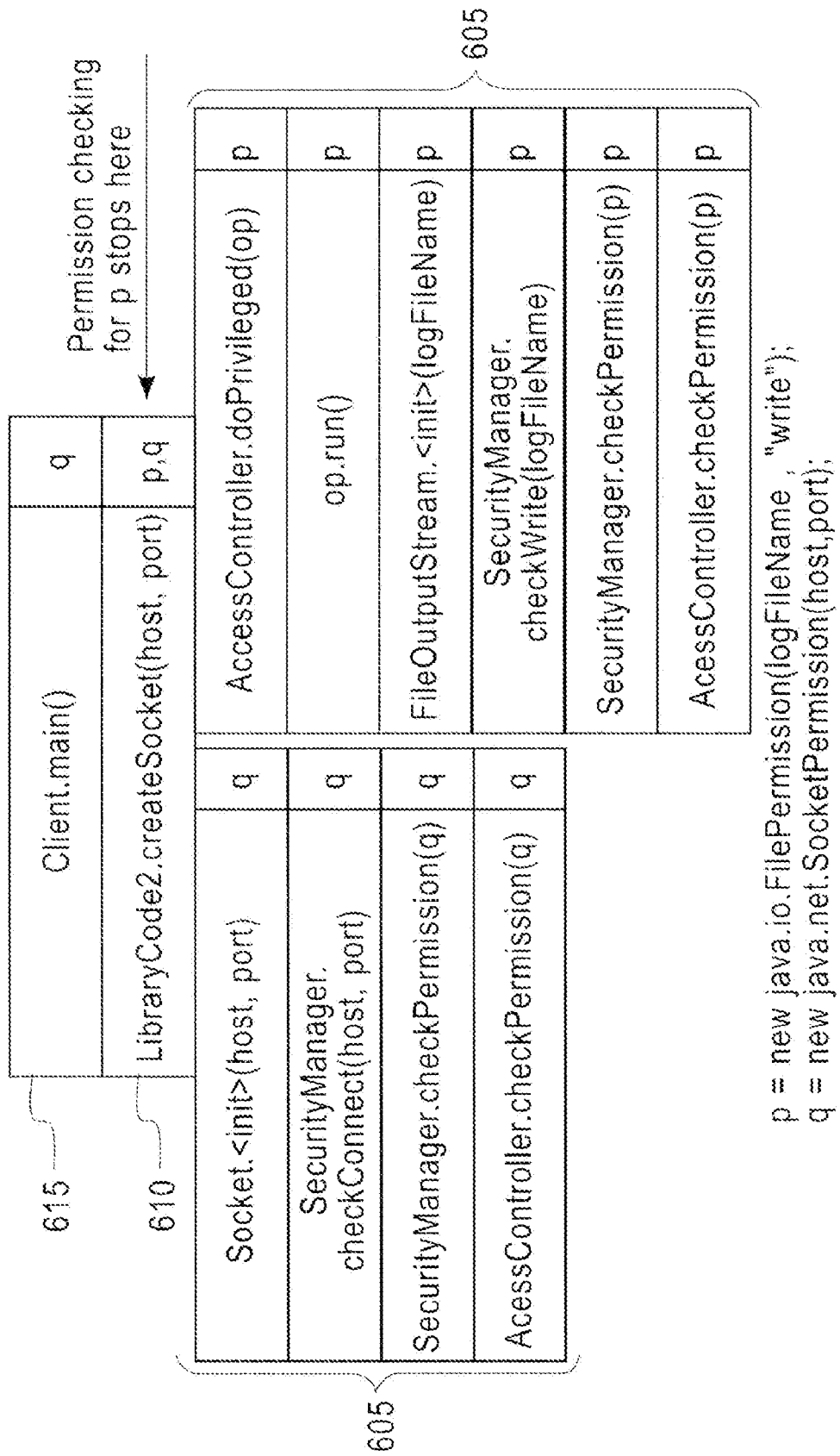
FIG. 6 illustrates one example of preventing the unnecessary authorization requirements for client code.

Class LibraryCode2 (illustrated in FIG. 5) is obtained by modifying class LibraryCode in FIG. 3 after wrapping the call to the FileOutputStream constructor in a privileged block to prevent client, code from requiring a FilePermission. As shown in FIG. 6, when the checkPermission method performs a stack walk to verify that all the code in the active calling sequence (605, 610, 615) has been granted the right to write to the log file, the LibraryCode2 class 610 will be required to have the necessary FilePermission, but the client code 615 running on top of the LibraryCode2 610 will not be required to have the necessary FilePermission. However, the client code 615 will still be required to have the SocketPermission necessary to open the socket since the call to the Socket constructor in LibraryCode is not privileged.

In the Java™ 2 SBAC system, when access to a restricted resource is attempted from within a child thread, it is not just the code on the stack of the child thread that must be granted the right to perform the access-restricted operation, but all the code in the child thread and in all its ancestor threads. This is done to prevent a program from performing security-sensitive operations by simply spawning a new thread, which would have fewer classes associated with the runtime stack, and therefore be potentially more trusted than its ancestor threads.

Subject-Based Authorization

Both Java™ and CLR allow basing authorization decisions on the user or service (called the Subject) that is executing the code. Java™ Authentication and Authorization Service (JAAS) extends the Java™ 2 code-based access control framework to support subject-based authentication and authorization. In Java™, a subject is represented as an object of type Subject. When a subject is authenticated, the corresponding Subject instance is populated with associated identities called principals, represented as objects of type Principal. A subject may have multiple associated principals. For example, if the subject is a person, two of the subject's associated principals could be the person's name and social security number.

In Java™ 2, access rights are granted to code and principals, but not directly to subjects. The set of access rights granted to a subject is obtained as the union of the sets of access rights granted to the subject's authenticated principals. The JAAS framework offers the static methods Subject.doAs and Subject.doAsPrivileged to perform a restricted operation with the access rights granted to a subject.

The doAs method takes two parameters: the first is a Subject object, and the second is either a PrivilegedExceptionAction or PrivilegedAction object. The code in the run method of the PrivilegedExceptionAction or PrivilegedAction instance is executed with the intersection of the sets of Permissions granted to the code on the call stack. However, doAs adds the Permissions granted to the subject's principals to the stack frames subsequent to the call to doAs.

The doAsPrivileged method is similar to doAs, but it takes a third parameter, an AccessControlContext object, which encapsulates an array of ProtectionDomains. Similar to doAs, the doAsPrivileged method also adds the Permissions granted to the subject's principals to the subsequent stack frames. However, unlike in the doAs case, when checkPermission is called with a Permission parameter p after a call to doAsPrivileged, the doAsPrivileged predecessors are not required to have been granted a Permission that implies p. Rather, doAsPrivileged interrogates the ProtectionDomains in the AccessControlContext passed to it as a parameter.

Violations of the Principle of Least Privilege may arise if any of the access rights granted to a subject's principals are unnecessary. Conversely, if the rights granted are insufficient to meet the security requirements of an application, run-time authorization failures may occur, which could cause the application to crash.

Similar to privilege-asserting code, code executed under the authority of a subject can be "unnecessary" or "redundant." Specifically, a call to doAs or doAsPrivileged is unnecessary if it does not lead to any checkPermission call, and it is redundant if all the checkPermission calls it leads to are covered by calls to doPrivileged. Code unnecessarily or redundantly executed under the authority of a subject may lead to violations of the Principle of Least Privilege, especially during subsequent code maintenance. Additionally, from a performance point of view, the execution of this unnecessary or redundant code can be expensive.

In particular, aspects of the present invention relate to statically determining the methods in a program under analysis that will be executed under the authority of a given subject at run time, and what access rights the program is granted by virtue of being executed under the authority of a subject. In a possible embodiment, the program under analysis is statically represented as an invocation graph and the set of access rights associated with the program is represented as a lattice. Based upon the security policy that has been associated with the program under analysis, it is possible to annotate the invocation graph with subject-granted access rights and use that information to establish the subject-granted access rights under which a method will be executed at run time.

The input to this subject-rights analysis consists of the program's object code and associated security policy. The annotated graph output by the subject-rights Analysis can be used to automatically detect which security-sensitive methods reachable at run time can be executed under the authority of a subject. This information can further be used to decide which access rights should be granted to that subject to prevent run-time authorization failures.

Advantages provided by aspects of the present invention include the feature that portions of code that are going to be executed under the authority of a subject are computed automatically, and without executing the code. This is an advantage because executing potentially malicious code may compromise the security of a system. Additionally, if a program execution does not exploit all the possible execution paths, some authorization properties and requirements may remain undiscovered until run time. Similarly, the access rights granted to subject-executed code are computed automatically and without executing the code. Since static analysis covers all the possible paths of execution, this invention has the advantage that if a portion of code can be executed under the authority of a subject, the analysis will detect the code. Similarly, if a piece of subject-executed code is executed with an access right p as a result of being executed by subjects, the analysis will detect the subject-executed code. The present invention does not require manual code inspection, since this invention allows analyzing object code, the inspection of the source code is not necessary.

The present embodiment utilizes graph theory to represent the execution of a program, and lattice theory to model the flow of information in the program itself. Every program being analyzed is modeled by an "invocation graph" and a "points-to graph."

An invocation graph, is a directed graph $G=(N, E)$, in which nodes correspond to method invocations, and two nodes $n_1, n_2 \in N$ are connected by an edge $(n_1, n_2) \in E$ if and only if the static analysis of the program conservatively establishes that the method represented by $n_1$ may invoke the method represented by $n_2$ at run time. A points-to graph is a directed graph $\overline{G}=(\overline{P},\overline{E})$, in which each vertex corresponds to either a program variable or an instance, and each edge indicates a points-to relation.

A data-flow analysis is performed on top of the invocation graph to achieve the Subject-Rights Analysis. As such, the structure of a complete lattice with finite height can be introduced on the set of access rights associated with a program or library and that the data-flow functions used by the analysis and defined on that lattice are monotonic with respect to the lattice's partial order (this aspect representing a necessary condition in which to apply Tarski's theorem, thus guaranteeing the convergence of a data-flow analysis algorithm).

While the analysis techniques described in this embodiment are in the context of Java™ code, the basic concepts are also applicable to non-Java™ SBAC systems that allow subject-executed code, such as Microsoft™ .NET Common Language Runtime (CLR).

Permission Graph, Permission Lattice, and Permission Set Lattice

When designing an algorithm that performs data flow on a graph, in order for Tarski's theorem to guarantee convergence to a fixed point in polynomial time, it is important to make sure that the data-flow functions defined at each node of the graph map a lattice into itself. The lattice is complete and has finite height, and the data-flow functions are monotonic with respect to the lattice's partial order. This section defines the lattice used as domain and co-domain for the data-flow functions of the subject-rights analysis. This lattice will be used to represent the access rights granted to Principals by the active security policy.

Permission Graph

The relationships induced by the implies methods among the Permission objects associated with a program can be modeled using a permission graph $H=(P, F)$, where P is a set of Permission objects and $F \subseteq P \times P$ is a set of edges of the form $p \rightarrow q$, where $p, q \in P$. For any two elements $p, q \in P, p \rightarrow q \in F$ holds true if, and only if, p.implies (q) returns true. Building a permission graph during the analysis requires detecting all the Permission objects that appear in the program, since each Permission object corresponds to an element of P. To build F, each $p \in P$ must be explicitly instantiated. This operation can be done during the analysis using reflection, based on p's permission ID. Next, for each pair $(p,q) \in P \times P$, it may be necessary to run p.implies (q) to decide whether $p \rightarrow q \in F$ or not.

Permission Lattice

The implies method does not necessarily induce a partial order on P. For instance, if p and q are two different Permission objects with the same permission ID, then $p \rightarrow q$ and $q \rightarrow p$. Therefore, H does not have the structure of a lattice, which would be desirable when performing data-flow analysis.

However, H can be transformed into a lattice as follows. Given $p, q \in P$, let $$p \xrightarrow{\ast} q$$

denote the presence of a path from p to q in H. Permission objects (p,q)∈P belong to the same Strongly Connected Component (SCC) of H and only if $$p \overset{\rightarrow}{\cdot} q$$

and $$q \overset{\rightarrow}{\cdot} p.$$

In this case, p and q are said to be equivalent, which is indicated with p≡q. Let $H_x=(P_x,F_x)=(p^{SCC},f^{SCC})$ be the Directed Acyclic Graph (DAG) induced by collapsing each SCC of H into a single node. If p∈P, is a representative of its SCC, then that SCC will be indicated with p. It is easy to see that $H_x$ has the structure of a partially ordered set.

This partially order set can be given the structure of a lattice by adding two new elements to $P_x$: T=AllPermission, denoting the SCC containing all the instances of the AllPermission class (if such a SCC does not already exist), and ⊥, a symbol denoting absence of authorizations. An instance of AllPermission implies any other Permission, therefore, T→p, ∀p∈$P_x$. Additionally, it is reasonable to impose that p→⊥, ∀p∈$P_x$. Let $\overline{P}_x$ be the augmented set $P_x \cup \{T\} \cup \{\bot\}$ and let $\overline{F}_x$ be the superset of $F_x$ obtained by adding to $F_x$ the edges involving the new elements T and ⊥. It is easy to prove that the graph $\overline{H}_x(\overline{P}_x,\overline{F}_x)$ represents the lattice $(\overline{P}_x, \supseteq)$, where $\supseteq$ is the partial order relation defined on a subset of $\overline{P}_x \times \overline{P}_x$ by $$p \supseteq q \Leftrightarrow p \overset{\rightarrow}{\cdot} q, \forall p, q \in \overline{P}_\equiv.$$

This lattice is called the permission lattice. Its top and bottom elements are T and ⊥ respectively. The meet and join operations $\cap, \cup : \overline{P}_x \times \overline{P}_x \to \overline{P}$ induced by $\supseteq$ on $\overline{P}_x$ are defined as follows, respectively:

$$p \cap q = r, \text{ where } r \in \overline{P}_\equiv \text{ is such that } p, q \supseteq r \text{ and } \quad \text{Eq. 1}$$
$$r \supseteq x, \forall x \in \overline{P}_\equiv : p, q \supseteq x$$

$$p \cup q = r, \text{ where } r \in \overline{P}_\equiv \text{ is such that } r \supseteq p, q \text{ and } \quad \text{Eq. 2}$$
$$x \supseteq r, \forall x \in \overline{P}_\equiv : x \supseteq p, q \forall p, q \in \overline{P}_\equiv$$

Permission Set Lattice

The Subject-rights analysis presented in this embodiment is modeled as a data-flow analysis in which sets of access rights (rather than single access-right elements) are propagated through the invocation graph representing the execution of a program. The analysis requires performing meet and/or join operations on those sets. Therefore, it is necessary to extend the meet and join operations, defined in regard to the permission lattice as detailed above, on elements of $\overline{P}_x$ to meet and join operations defined on sets of elements of $\overline{P}_x$. In other words, it is necessary to define a meaningful lattice structure on the power set $P(\overline{P}_x)$.

Naturally, $P(\overline{P}_x)$ the lattice structure defined by the regular set inclusion, $\supseteq$, which induces set intersection, ∩, and set union, ∪, as meet and join operations. However, the lattice $(P(\overline{P}_x),\cap,\cup)$ would not be appropriate for authorization analyses. For example, let p and q be two Permission objects instantiated through the two following lines of code:

Permission p=new FilePermission("C:\\*", "read"); Permission q=new FilePermission("C:\\log.txt", "read, write");

According to the notation introduced in regard to the permission lattice, the SCCs of p and q in the permission graph are indicated with p and q, respectively. The subject-rights analysis requires performing a forward propagation of $P(\overline{P}_x)$ elements across the invocation graph representing the execution of the program under analysis. In this case, the operation performed on the lattice elements must be meet. If n is a node in the invocation graph, n1 and are two predecessors of n, and an analysis has established that $n_1$ and $n_2$ will be potentially executed with access rights represented by sets {p} and {q}, respectively, then the safest, though most conservative, assumption if the $(P(\overline{P}_x),\cap,\cup)$ lattice structure is adopted is that n will be executed with an empty set of access rights since $\{p\} \cap \{q\}= \bigcirc$, as shown in FIG. 7.

This result is overly conservative. Instead, let r be any FilePermission object instantiated through a line of code similar to the following:

Permission r=new FilePermission ("C:\\log.txt", "read");

Since p∩q=r, it would be more desirable to be able to compute that n will be executed with access-right set (r).

A more meaningful lattice structure can be given to $P(\overline{P}_x)$ based on the lattice structure of $(\overline{P}_x, \supseteq)$. A set $Q \in P(\overline{P}_x)$ is said to be canonical if:

$$p \neq q \Rightarrow (p \not\supseteq q) \wedge (q \not\supseteq p), \forall p, q \in Q \quad \text{Eq. 3}$$

Intuitively, if $Q \in P(\overline{P}_x)$ is canonical, no element in Q implies any other element in Q except itself. A canonical reduction function $x: P(\overline{P}_x) \to P(\overline{P}_x)$ can be defined that maps any set $Q \in P(\overline{P}_x)$ to its subset $xQ \in P(\overline{P}_x)$ obtained by removing from Q all the elements that are implied by some other element of Q. Formally:

$$\lambda(Q) = \{q \in Q : r \not\supseteq q, \forall r \in Q\} \quad \text{Eq. 4}$$

The X function is well defined because for any $Q \in P(\overline{P}_x)$, there exists one and only one canonical set corresponding to Q.

Next, the functions $\cap, \cup : P(\overline{P}_x) \times P(\overline{P}_x) \to P(\overline{P}_x)$ can be defined as follows, respectively:

$$Q \cap R = x(\{q \cap r : q \in Q, r \in R\}) \quad \text{Eq. 5}$$

$$Q \cap R = x(Q \cup R) \forall Q \in P(\overline{P}_\equiv) \quad \text{Eq. 6}$$

It is easy to prove that the functions ∩ and ∪ are both commutative, associative, and mutually absorptive. Therefore, $(P(\overline{P}_x),\cap,\cup)$ is a lattice, called the permission-set lattice, thus ∩ and ∪ are its meet and join operations, respectively. For a given program or library, P is finite. This implies that the permission-set lattice associated with a program or library also is finite, and is therefore complete. Its top element is the set {AllPermission}. Its bottom element is the empty set $\bigcirc$.

The partial order $\supseteq$ induced by $\cap$ and $\cup$ on $P(\overline{P_x})$ is obtained as follows:

$$Q \supseteq R \Leftrightarrow Q \cap R = R, \forall Q, R \in P(\overline{P_=}) \quad \text{Eq. 7}$$

Or, equivalently:

$$Q \supseteq R \Leftrightarrow Q \cup R = R, \forall Q, R \in P(\overline{P_=}) \quad \text{Eq. 8}$$

Since the permission-set lattice is finite, its height $H(P(\overline{P_x}))$ is finite too. Specifically, $H(P(\overline{P_x})) \in O(|P|)$. Finally, the difference operation,—:$P(\overline{P_x}) \times P(\overline{P_x}) \to P(\overline{P_x})$ is obtained as follows:

$$Q - R = \chi(\{q \in Q: \not\exists r \in R, r \sqsupseteq q\}), \forall Q, R \in \mathcal{P}(\overline{P_=}) \quad \text{Eq. 9}$$

Invocation Graph

The first step in this Subject-rights analysis embodiment is to construct an augmented, domain-specific invocation graph called a Subject-Rights Invocation Graph (SRIG). An SRIG is a directed multi-graph G=(N, E), where N is a set of nodes and E is a set of edges. Each node comprised within the graph represents a context-sensitive method invocation, and is uniquely identified by its calling context. The calling context comprising the called target method, and the receiver and parameters values of the called target method. Each node also comprises state information pertaining to the target de-virtualized method, and in regard to instance methods, a set of possible allocation sites for the method's receiver. Further, all parameters to the method are represented as a vector of sets of possible allocation sites, and a set of possible return value allocation sites from this method are provided.

Each node is further associated with a static representation of a class loader corresponding to the name of the class loader that would load the method's declaring class at run time, based on configuration information provided as input to the SRIG construction engine. Also, each labeled edge e=(m,n) ∈E points from a call site in the method represented by node m to the target method represented by node n, and further, an SRIG allows for bidirectional traversal.

An SRIG has a unique node, $\bar{n} \in N$, called the root, representing a client program invoking the entry points of the program under analysis. Therefore, if $s_1, s_2, \ldots s_k \in N$ are the nodes representing the program entry points, there exist k edges $e_1 = (\bar{n}, s_1), e_2 = ((\bar{n}, s_2), \ldots, e_k = (\bar{n}, s_k)$ connecting $\bar{n}$ with $s_1, s_2, \ldots s_k$, respectively. The presence of $e_1, e_2, \ldots e_k$ and the fact, that, a node $\bar{n} \in N$ is constructed if and only if it has been statically established that the method represented by n, can be invoked during the execution of the program under analysis, guarantee that all the nodes in the invocation graph are reachable from $\bar{n}$. This implies also that the SRIG graph is a connected multi-graph.

An SRIG can be constructed on top of any static-analysis framework. The present embodiment uses an analyzer that adopts a Control-Flow Analysis (CFA) disambiguating between heap objects according to their allocation sites, with extra context for Permission and AccessControlContext objects, since these objects are often allocated in factory methods. In order to achieve good precision, and maintain good scalability, the underlying static analysis engine should be:

Path insensitive—the static analysis engine does not evaluate conditional statements and conservatively assumes that each conditional branch out of a conditional statement will be executed;

Intra-procedurally flow sensitive—the static analysis engine considers the order of execution of the instruction within each basic block, accounting for local-variable kills and casting of object references;

Inter-procedurally flow insensitive—the static analysis engine uses the conservative assumption that all instance and static fields are subject to modification at any time due to multi-threading;

Context sensitive—the static analysis engine's inter-procedural analysis uniquely distinguishes each node by its calling context, with a context-sensitivity policy similar to Agesen's Cartesian Product Algorithm (CPA); and Field sensitive—the static analysis engine represents an object's fields distinctly in the solution.

From a security perspective, context sensitivity is very important since an authorization analysis for Java™ needs to distinguish the different calls to checkPermission based on the Permission parameters passed to the checkPermissions, and different calls to doAs and doAsPrivileged based on the Subject parameters passed to them. If this were not the case, all the checkPermission, doAs, and doAsPrivileged calls in the program would be represented as one node in the SRIG, and any authorization analysis based on that SRIG would conservatively join together all the subject-rights analysis results identified in the program.

Access-Rights Points-To Graph

Contextually with the intra-procedural and inter-procedural analyses that lead to the creation of the SRIG, JaBA performs a pointer—an analysis and constructs a Subjects-Rights Point-to Graph (SRPTG) $\overline{G} = (\overline{N}, \overline{E})$. From a logical point of view: The nodes in the SRPTG can represent either an instance key or a pointer key. An instance key is a representative of an equivalence class of heap objects that can be pointed to. The equivalence relation between the heap objects depends on the object sensitivity of the analysis. Since the static analyzer described and used by this embodiment distinguishes objects based on their types and allocation sites, two objects are equivalent if and only if they share the same allocation site. Specifically, an instance key is of the form I=(m,w), where m is a method and w is an allocation site within m, represented as the program counter of an allocation statement within m. Therefore, in the context of the SBAC model presented in this embodiment, the heap objects in an instance key can be represented as their common allocation site.

A pointer key J is a representative for an equivalence class of pointers. In particular, a pointer key is a pair J=(I, f), where I is an instance key and f is a field reference representing all the instances of a given field with receiver I in the heap, or of a particular static field.

The set of edges $\overline{E}$ is a subset of $\overline{P} \times \overline{P}$. Specifically, there is an edge from a pointer key J to an instance key I if and only if the pointer analysis indicates that J may point to J. Further, there is an edge from an instance key I to a pointer key J if and only if J represents a field of an object instance modeled by I or J represents the army contents of array instance I.

As an example, FIG. 9 shows an SRPTG fragment corresponding to the code of FIG. 8. assuming that method foo is invoked on an instance of class X represented by instance key $I_1$, and that $w_1$, $w_2$, and $w_3$ are allocation sites of the A instance in the constructor of X, the Object instance in the constructor of A, and the Object instance in X.foo, respectively. The execution of set B triggered by the invocation of foo modifies the Object value of field b. However, in the corresponding points-to graph, the pointer key $J_2=(I_2, b)$ conservatively points to both Object instance keys $I_3$ and $I_4$ because JaBA is flow insensitive for fields.

Figures 10, 11:
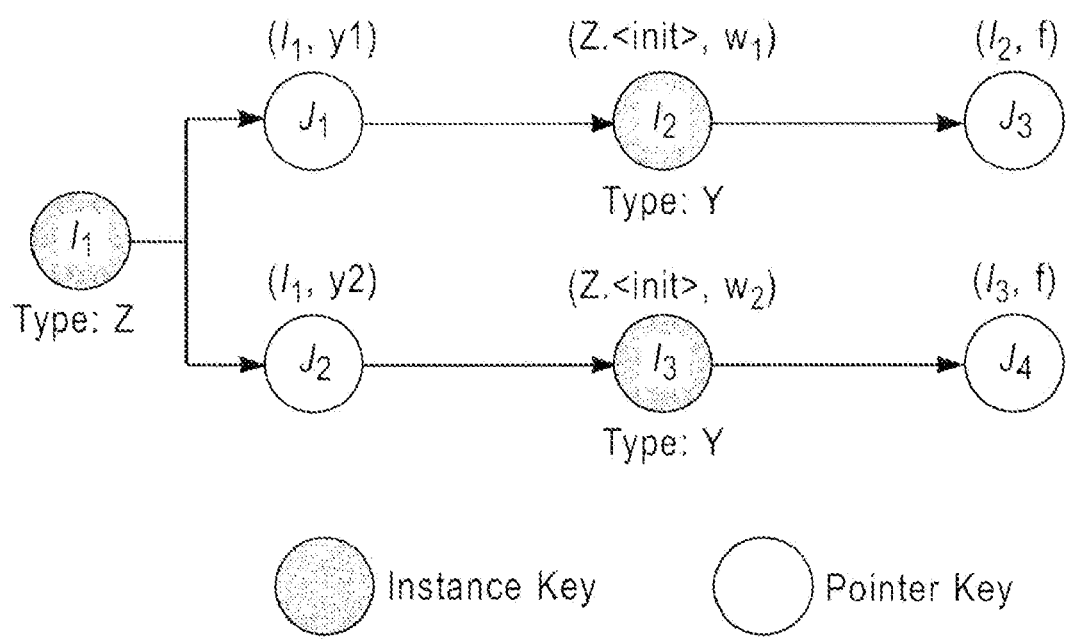
FIG. 10 illustrates one example of code representing the precision in the representation of fields.
FIG. 11 illustrates one example a SPRTG corresponding to the code of FIG. 10.

The lack of precision due to inter-procedurally flow insensitivity is compensated by the fact that, pointer keys representing fields are disambiguated in the SRPTG based not just on field references, but also on field receivers. FIGS. 10 and 11 demonstrate this characteristic of the SRPTG. As FIG. 11 shows, in the SRPTG there are two pointer keys representing fields $y_1$ and $y_2$ because JaBA is field sensitive, and there are two pointer keys representing field f because pointer keys are distinguished based not only on field references, but, also on field receivers. In this model, $I_2$ and $f_3$ are two different receivers for field f because they represent two different objects of class Y allocated, respectively, at sites $w_1$ and $w_2$ inside the constructor of Z.

An SRIG and its associated SRPTG are used to execute the subject-rights analysis of a Java™ program or library. The purpose of the subject-rights analysis is to determine which methods in the program under analysis will be executed under the authority of a subject at run time. The subject-rights analysis identifies which rights have been granted to subject s based on the current, security policy. Specifically, for each Subject objects instantiated in the program, the subject-rights analysis statically detects which rights have been granted to s based on the Principals encapsulated within s and the active security policy. Next, the subject-rights analysis annotates the subject-rights invocation graph; each node n∈N is mapped to the element of the permission-set lattice representing the subject-granted access rights under which the method corresponding to n will be executed at run time. A related problem that is solved by the subject-rights analysis is to identify all unnecessary and redundant calls to doAs and doAsPrivileged.

Subject-Rights Analysis

The Java™ 2 Stack-Based Access Control (SBAC) architecture includes the possibility to grant access rights to users and services, known as subjects. The Java™ 2 security component responsible for subject-based authentication and authorization is called Java™ Authentication and Authorization Service (JAAS). The purpose of the subject-rights analysis to statically determine which methods in the program under analysis will be executed under the authority of a given subject at run time. Based on the security policy databases associated with the program under analysis, it is possible to annotate the subject-rights invocation graph (SRIG) with subject-granted access rights and use that information to establish the subject-granted access rights under which a method will be executed at run time.

The input to the subject-rights analysis consists of a program's object code and associated security policy database. The annotated SRIG output by the subject-rights analysis can be used to automatically detect which security sensitive methods reachable at run time can be executed under the authority of a subject. This information can be used to decide which access rights should be granted to that subject to prevent run-time authorization failures.

Within aspects of the present invention a data-flow analysis model for propagating subject granted access rights along an SRIG G=(N, E) representing the execution of a program is utilized. The propagation algorithm converges in finite time and, as a result, annotates G as follows: For each node n∈N, a function $\Sigma: N \rightarrow P(\overline{P_x})$ constructed that maps n to the subset $\Sigma(n)$ of $\overline{P_x}$ corresponding to the subject-granted access rights propagating to the method represented by n in the context specified by n, where P is now the set of Permission objects granted to the Subjects executing the program under analysis, and is the permission lattice constructed from P as indicated above in regard to the permission lattice.

The subject-granted access rights are represented as elements of the permission-set lattice, $P(\overline{P_x})$. To compute such elements, it is necessary to statically model the JAAS SBAC architecture, in which a Subject s can be associated with an AccessControlContext by making a call to doAs or doAsPrivileged. At that point, all the Permissions granted to s are added to the stack frames subsequent the doAs or doAsPrivileged call. Determining access-right requirements involves propagating elements of $P(\overline{P_x})$ across the SRIG representing the execution of the program under analysis. The operations used on the lattice elements are meet and join.

Permission-Set Lattice of Subject-Granted Access Rights

According to the JAAS architecture, an authenticated Subject is granted the Permissions of its encapsulated Principals. Permissions in Java™ 2 are granted to a Principal based on two pieces of information: the fully qualified class name of a Principal and the Principal's name, which is the String value returned by the getName method of the Principal object. For example, FIG. 12 shows a policy file snippet in which three access rights are granted to all Principals of type X500Principal, with Distinguished Name (DN) composed of Common Name (CN) Marco Pistoia, Organization Unit (OU) Research Organization (O) IBM, and Country (C) US. It is possible to include more than one Principal field in a grant statement, as in the policy file of FIG. 13. If a grant entry contains more than one Principal field, the Permissions in the grant statement are awarded to the Subject associated with the current AccessControlContext only if that Subject contains all those specified Principals.

For example, let D be the security policy database associated with the program under analysis, and let |D| indicate the number of grant statements in D. The first, step of the subject-rights analysis algorithm is to scan D, retrieve from it the permission IDS that are mapped to each Principal class and name pair, and use reflection to instantiate the Permission objects corresponding to those permission IDS. Such Permission objects form the set P, which can be used to construct the permission graph H=(P,F), permission lattice $(\overline{P_x}, \supseteq)$, and permission-set lattice $(P(\overline{P_x}), \cup, \cap)$ representing the access rights granted to the Subjects of a program based on their Principals and the policy specified in D. Subsets of the permission lattice will be met at each node n∈N every time an edge e∈E of the form e=(m, n):m∈N is traversed during the fixed point iteration. In the worst case, the meet operation will have to be applied $H(P(\overline{P_x}))$ times for each edge of the graph.

Subject-Rights Analysis Initialization

Let D be the subset of N of all the doAs and doAsPrivileged nodes in the SRIG. The first initialization step consists of computing D by simply iterating over all the elements of N. Both doAs and doAsPrivileged take a Subject object as one of the parameters. Let n be any element of D. The subject-rights analysis identifies the set $\psi_D(n) = \{s_1, s_2, \ldots s_j\} \subseteq S$ of all the possible Subject allocation sites that may have flowed to the formal Subject argument of the method call represented by n, where S is the union of all the doAs and doAsPrivileged Subject parameter sets in C. This defines a function $\psi_D: D \rightarrow P(S)$ that maps nodes of D to subsets of S.

An authenticated Subject is granted all the Permissions of its associated Principals. Therefore, for each Subject allocation site s∈S, the subject-rights analysis identifies the set $\psi_D(n) = \{u_1, u_2, \ldots u_{ij}\} \subseteq U$ of all the Principal allocation sites representing the equivalence classes of the Principal objects encapsulated in s in the analysis model, where U indicates the set of all the Principal allocation sites pointed to by the elements of S in the Access-Rights Points-to Graph (SRPTG) $\overline{G}=(\overline{N}, \overline{E})$ associated with G. Computing $\psi_S(s)$ requires identifying all the Principal instance keys in $\overline{N}$ pointed to by the principals Set field in s.

As discussed above in regard to the discussion of the permission-set lattice of subject-granted rights, given a Principal object u encapsulated in an authenticated Subject s, two pieces information about u are important when s needs to be authorized to access a restricted resource: the fully qualified class name of u and the name of u. These two pieces of information can be statically retrieved since that information is stored into the allocation-site representation of u created by JaBA. Let C indicate the set of all the fully qualified class names of the Principal allocation sites in U. A function $v_C: U \to C$ can be constructed that maps each Principal allocation site $u \in U$ to its fully qualified class name $v_C(u) \in C$.

The information can also be easily retrieved by a secondary methodology, since all of the non-abstract classes that inherit from the Principal interface must implement an instance method, getName, which returns the name of the Principal instance as a string object. At run time, for each Principal object u encapsulated in an authenticated Subject s, the Java™ authorization system invokes getName on u every time doAs or doAsPrivileged is called with s as the Subject parameter. This guarantees that, for any $u \in U$, $\overline{N}$ contains at least one node representing the invocation of getName on u. It is possible that $\overline{N}$ contains more than one such node if u is found in different getName receiver sets in the SRIG. Let T be the set of all the string constants that have flowed to the return values of all the Principal getName SRIG nodes. For any $u \in U$, the set $v_T(u)$ of all the elements of T that could have flowed to the return values of all the getName SRIG nodes having u in the receiver set should be identified.

Let g be any grant statement, in D, similar to those shown in FIGS. 12 and 13. More generally, g will be of a form similar to the one in FIG. 14, which asserts that a Subject s is granted Permissions $p_1, p_2, \ldots, p_k \in P$ if s encapsulates, at least, h Principal objects with fully qualified class names $c_1, c_2, \ldots, c_h \in C$ and names $t_1, t_2, \ldots, t_h \in T$, respectively.

Let $n \in D$ be the node examined above, with $\psi_D(n)=\{s_1, s_2, \ldots, s_j\} \in P(S)$. For any $r \in \{1, 2, \ldots, j\}$, $\psi_S$ can be applied to $s_r$, and the result will be of the form:

$$\psi_S(S_r) = \{u_{r1}, u_{r2}, \ldots, u_{ij_r}\} \in P(U) \qquad \text{Eq. 10}$$

This allows computing $\Sigma(n)$, the subset of $\overline{P_x}$ representing the subject-granted access rights under which the doAs or doAsPrivileged method represented by n, in the context specified by n, will be executed at run time. First of all, to detect whether or not the access rights granted by g apply to n, it is sufficient to proceed follows:

$$\text{Let } \psi_{s,g}: \{c_1, c_2, \ldots, c_h\} \to \mathcal{P}(\{1, 2, \ldots, i_r\}) \qquad \text{Eq. 11}$$

be defined by:

$$\psi_{s,g}(c_l) = \{x \in \{1, 2, \ldots, i_r\} : v_C(u_{rx}) = c_l\},$$

$$\forall l \in \{1, 2, \ldots, h\}$$

Computing $\psi_{s,g}$ can be accomplished with one iteration over the elements of $\psi_S(S_r)$. It should be observed also that $\psi_{s,g}$ partitions the set of indices $\{1, 2, \ldots, i_r\}$ in equivalence classes. Specifically, two indices x, $y \in \{1, 2, \ldots, i_r\}$ are in the same equivalence class if and only if either $\exists l \in \{1, 2, \ldots, h\}: v_C(u_{rx}) = c_l$ or $v_C(u_{rx}), v_C(u_{ry}) \notin \{c_1, c_2, \ldots, c_h\}$.

Furthermore, let $\Sigma /_{S \times D}: S \times D \to P(\overline{P_x})$ be the function mapping a pair $(s, g) \in S \times D$ to the subset of representing the access rights granted by g to the Principals encapsulated in s. For any given $r \in \{1, 2, \ldots, j\}$, $\Sigma /_{S \times D}(s_r, g)$ can be computed using the algorithm shown in FIG. 15, wherein the notation introduced in discussed in regard to the subject-rights analysis initialization, $p_1, p_2, \ldots, p_k$ represent the permission lattice elements corresponding to the Permission objects $p_1, p_2, \ldots, p_k$, respectively.

To understand how the algorithm in FIG. 15 works, it should be noted that lines 1-3 simply verify that for each Principal class name $c_1$ specified in g there exists at least one Principal encapsulated in s, whose class has that name. If this is not the case, then none of the Permissions listed in g can be applied to s, and $\Sigma /_{S \times D}(s_r, g) = \bigcirc$.

Further, lines 4-11 are used to verify that for every Principal class name specified in g, there exists at least one Principal, among those encapsulated in $s_r$, with name $t_1$ and class name $c_1$. If this is not the case, then, once again, none of the Permissions listed in g can be applied to s, and $\Sigma /_{S \times D}(s_r, g)$.

The presence of the return statements in Lines 3 and 11 guarantees that Line 12 is executed if and only if $s_r$ encapsulates at least h Principal objects with fully qualified class names $c_1, c_2, \ldots, c_h \in C$ and names $t_1, t_2, \ldots, t_h \in T$, respectively, in which case $s_r$ is granted all the Permissions listed in g, as desired.

If multiple grant statements in D apply to $s_r$, then the permission-set lattice elements from all those grant statements must be joined, and the resulting permission-set lattice element, indicated with $\Sigma /_{S \times D}(s_r)$ represents the access rights granted to $s_r$ as follows:

$$\sum\nolimits_S (s_r) = \bigsqcup_{g \in D} \sum |_{S \times D}(s_r, g) \qquad \text{Eq. 12}$$

This way, a function $\Sigma /_S : S \to P(\overline{P_x})$ is defined.

The Subject-rights analysis cannot statically determine which Subject allocation site in the parameter set $\psi_D(n)=\{s_1, s_2, \ldots, s_j\}$ will be actually passed as a parameter to the doAs or doAsPrivileged method represented by n at run time. Therefore, when computing the subject-granted access rights under which the method call represented by n, is executed, the safest, though most conservative, assumption is to apply the meet operation to all the permission set lattice elements associated with the Subject allocation sites $s_1, s_2, \ldots, s_j$ follows:

$$\sum (n) = \bigsqcap_{r=1}^{j} \sum (s_r) \qquad \text{Eq. 13}$$

Forward Propagation of Permission-Set Lattice Elements

When doAs or doAsPrivileged is invoked with a Subject parameter s, the Permissions granted to the Principals associated with s are added to the stack frame corresponding to doAs or doAsPrivileged, and to those corresponding to all the downstream calls. A static model of this SBAC aspect requires propagating $\Sigma /_S(s)$ to all the descendants of the doAs or doAsPrivileged node in the SRIG.

For any node $n \in N$, let $\text{Gen}_s(n)$ and $\text{Kill}_s(n)$ indicate the subsets of whose elements correspond to the subject-granted access rights generated and killed, respectively, by node n. If $n \in D$, then $\text{Gen}_s(n) = \Sigma(n)$, otherwise $\text{Gen}_s(n) = \bigcirc$. To compute $\text{Kill}_s(n)$, it should be noted that it is possible to call doAs multiple times within a thread, but only one Subject may be active at a time. If doAs is called with Subject parameter s, and later in the same thread there is another call to doAs with Subject parameter t, any subsequent authorization check will be performed with the authorizations granted to t, not those granted to s. The effect of the second call to doAs is to kill the authorizations granted to s until the second doAs call completes and returns to its caller. Similar considerations apply to doAsPrivileged.

Further, in the absence of Subject objects associated with a thread, a call to doPrivileged causes checkPermissions to stop the stack walk at the stack frame corresponding to the method that made the doPrivileged invocation. Since JAAS is fully integrated with the Java™ 2 SBAC architecture, including doPrivileged, the same principle applies when a Subject object is present. If a doPrivileged call is made after a doAs or doAsPrivileged call with Subject parameter s, s is not visible when an authorization check is performed by a checkPermission call. The effect of calling doPrivileged is to kill the authorizations granted to s. Therefore, for any doAs, doAsPrivileged, or doPrivileged node n∈N, $Kill_s(n)$ is the universe $\overline{P_x}$. For all other nodes n∈N, $Kill_s(n)=\emptyset$. This defines the two functions $Gen_A$, $Kill_A:N \rightarrow P(\overline{P_x})$.

The subject-rights analysis data-flow equation system, for each node n∈N, is defined as follows:

$$Out_S(n) = Gen_S(n) \sqcup (In_S(n) - Kill_S(n)) \qquad \text{Eq. 14}$$

$$In_S(n) = \bigcap_{m \in \Gamma^-(n)} Out_S(m)$$

Where $Out_s(n)$ and $In_s(n)$ are the subsets of corresponding to the subject granted access rights propagated from and reaching n, respectively. Tarski's Theorem implies that the recursive computation of the functions $In_s$, $Out_s:N \rightarrow P(\overline{P_x})$ performed by resolving Equation 14 converges to a fixed point with a worst-case complexity of $O(|E| \cdot H(P(\overline{P_x})))$. In particular:

Convergence of Equation 14 is guaranteed by the fact that, for each node n∈N, the data-flow function, $\beta_n:P(\overline{P_x}) \rightarrow P(\overline{P_x})$ that transforms $In_s(n)$ into $Out_s(n)$ is defined on a complete lattice, $(P(\overline{P_x}), \cap, \cup)$ which has finite height, and monotonic with respect to the lattice's partial order $\supset$.

The worst-case complexity is $O(|E| \cdot \overline{H}(P(\overline{P_x})))$ because each edge of the SRIG will need to be traversed $H(P(\overline{P_x}))$ times in the worst-case scenario. Since $H(P(\overline{P_x})) \in O(|P|)$ the worst case complexity can be expressed as $O(|E| \cdot |P|)$ The fact that the forward propagation of permission-set lattice elements is initialized only with the nodes in D significantly reduces the time complexity in typical cases, since large portions of the SRIG are likely not to contain any doAs or doAsPrivileged call and will never be affected by the fixed-point iteration generated by Equation 14.

SRIG Annotation

When the data-flow algorithm just describes terminates, each node n∈N can be labeled with the subset $\Sigma(n)$ of $\overline{P_x}$ defined by:

$$\Sigma(n) = Out_s(n) \qquad \text{Eq. 15}$$

Figure 16:
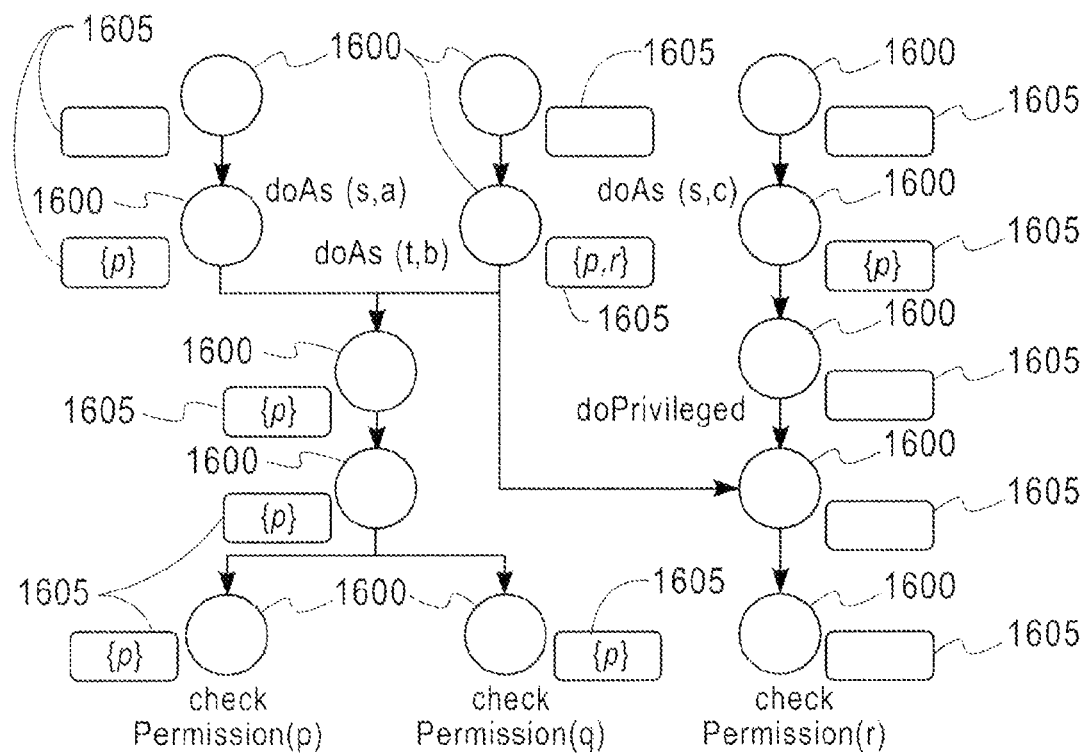
FIG. 16 illustrates one example a flow diagram detailing an annotated SRIG after the completion of a subject-rights analysis.

Equation 15 approximates the subject-granted access rights under which the method represented by n, in the calling context specified by n will be executed at run time. FIG. 16 shows a SRIG annotated with the values of function Σ. The SRIG contains three calls to doAs, one to doPrivileged, and three to checkPermission. The three calls to doAs take parameter pairs (s, a), (t, b), and (s, c), respectively, where s and t are Subject allocation sites, and a, b, and c are PrivilegedAction allocation sites. The three calls to checkPermission take Permission parameters p, q, and r respectively. The SRIG annotation shows how the call to doPrivileged eliminates from the AccessControlContext the access rights granted to s.

As further illustrated in FIG. 16, each node 1600 of the invocation graph has been mapped to a set of permission abstraction 1605. Each permission abstraction 1605 as shown serves as a Permission allocation site. The permission abstractions 1605 approximate what permissions code will receive by virtue of being executed by a subject. For example, method doAs(s, a) transmits permission set {p} to all the methods subsequently invoked (because p is the permission granted to s). Method doAs(s, c) transmits permission set {p, r}. At the merge points the intersection of the two sets are conservatively taken, this being {p}. Further, it must be noted that doPrivileged( ) truncates the permission set propagation. For this reason, doPrivileged( ) and all its successors are not marked with permission sets 1605.

Within aspects of the present invention it may be desirable to compute the subject-granted access rights under which a method can be executed assuming all the calling contexts that are realizable in the program under analysis. A function $\mu_s:M \rightarrow P(\overline{P_x})$ is defined that maps each method m reachable from some entry point of the program under analysis to the subset of $\overline{P_x}$ representing the subject-granted access rights under which that method can be executed. Specifically, $\mu_S(m)$ is defined as follows:

$$\mu_S(m) = \bigcap_{i=1}^{k} \Sigma(n_i) \qquad \text{Eq. 16}$$

Where $\{n_1, n_2, \ldots, n_k\} = v(m)$. The safest, though most conservative, approach is to compute the meet of the subsets $\Sigma(n_1), \Sigma(n_2), \ldots, \Sigma(n_k)$ of $\overline{P_x}$, rather than joining them. The reason is that, during the analysis, it is not, known which calling context, among those of $n_1, n_2, \ldots, n_k$, m will be invoked with. As a result, it is not known which Subject will be executing m.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for identifying subject-executed code and subject-granted access rights within a program, the method further comprising the steps of:
   constructing a static model of a program with a processor, wherein the static model comprises:
      an invocation graph (G=(N, E)), the invocation graph comprising a set of nodes (N) and a set of edges (E), the invocation graph being configured to visually represent programming methods as nodes, and the calling context that is associated with a respective programming method; and
      a points-to graph ($\overline{G}=\overline{P},\overline{E}$), where P is a set of permission objects, the points-to graph being configured to model the dependencies that exist between program objects;
   determining a set of access rights that are associated with each subject object that is comprised within the program;
   annotating the invocation graph with the set of access right data to generate a subject-rights analysis, wherein each node comprised within the invocation graph is mapped to a set of access rights that represent subject-granted access rights under which a method that corresponds to a respective node will be executed; and
   utilizing the subject-rights analysis to perform a subject-rights analysis of the program.

2. The method of claim 1, wherein the set of access rights that are associated with each subject object is determined based upon principals that are encapsulated within the subject object and data from an active security policy database that has been associated with the program.

3. The method of claim 2, wherein the step of utilizing the subject-rights analysis to perform a subject-rights analysis of the program comprises the step of determining which methods of the program will be executed under the authority of a specified subject object upon the execution of the program.

4. The method of claim 3, wherein the result of the method execution determination is utilized to determine access rights that are to be granted to the specified subject in order to prevent a run-time authorization failure.

5. The method of claim 2, wherein the step of utilizing the subject-rights analysis to perform a subject-rights analysis of the program comprises the step of determining access rights that the program is granted by being executed under the authority of a respective subject object.

6. A computer program product that includes a non-transitory computer readable medium useable by a processor, the medium having stored thereon a sequence of instructions which, when executed by the processor, causes the processor to identify subject-executed code and subject-granted access rights within a program, wherein the computer program product executes the steps of:
   constructing a static model of a program, wherein the static model comprises:
      an invocation graph (G=(N, E)), the invocation graph comprising a set of nodes (N) and a set of edges (E), the invocation graph being configured to visually represent programming methods and the calling context that is associated with a respective programming method; and
      a points-to graph ($\overline{G}=\overline{P},\overline{E}$), where P is a set of permission objects, the points-to graph being configured to model the dependencies that exist between program objects;
   determining a set of access rights that are associated with each subject object that is comprised within the program; and
   annotating the invocation graph with the set of access right data to generate a subject-rights analysis, wherein each node comprised within the invocation graph is mapped to a set of access rights that represent subject-granted access rights under which a method that corresponds to a respective node will be executed.

7. The computer program product of claim 6, wherein the set of access rights that are associated with each subject object is determined based upon principals that are encapsulated within the subject object and data from an active security policy database that has been associated with the program.

8. The computer program product of claim 7, wherein the step of utilizing the subject-rights analysis to perform a subject-rights analysis of the program comprises the step of determining which methods of the program will be executed under the authority of a specified subject object upon the execution of the program.

9. The computer program product of claim 8, wherein the result of the method execution determination is utilized to determine access rights that are to be granted to the specified subject in order to prevent a run-time authorization failure.

10. The computer program product of claim 7, wherein the step of utilizing the subject-rights analysis to perform a subject-rights analysis of the program comprises the step of determining access rights that the program is granted by being executed under the authority of a respective subject object.

11. A computer system including an article of manufacture for identifying subject-executed code and subject-granted access rights within a program, the article of manufacture storing machine readable instructions, which when executed cause the machine to perform the steps of:
   constructing a static model of a program, wherein the static model comprises:
      an invocation graph (G=(N, E)), the invocation graph comprising a set of nodes (N) and a set of edges (E), the invocation graph being configured to visually represent programming methods and the calling context that is associated with a respective programming method; and
      a points-to graph ($\overline{G}=\overline{P},\overline{E}$), where P is a set of permission objects, the points-to graph being configured to model the dependencies that exist between program objects;
   determining a set of access rights that are associated with each subject object that is comprised within the program;
   annotating the invocation graph with the set of access right data to generate a subject-rights analysis, wherein each node comprised within the invocation graph is mapped to a set of access rights that represent subject-granted access rights under which a method that corresponds to a respective node will be executed; and
   utilizing the subject-rights analysis to perform a subject-rights analysis of the program.

12. The computer system of claim 11, wherein the set of access rights that are associated with each subject object is determined based upon principals that are encapsulated within the subject object and data from an active security policy database that has been associated with the program.

13. The computer system of claim 12, wherein the step of utilizing the subject-rights analysis to perform a subject-rights analysis of the program comprises the step of determining which methods of the program will be executed under the authority of a specified subject object upon the execution of the program.

14. The computer system of claim 13, wherein the result of the method execution determination is utilized to determine access rights that are to be granted to the specified subject in order to prevent a run-time authorization failure.

15. The computer system of claim 12, wherein the step of utilizing the subject-rights analysis to perform a subject-rights analysis of the program comprises the step of determining access rights that the program is granted by being executed under the authority of a respective subject object.

* * * * *